United States Patent

(12) United States Patent
Mayinger

(10) Patent No.: US 9,982,987 B2
(45) Date of Patent: May 29, 2018

(54) METHOD FOR DETERMINING MEASUREMENT CONDITIONS OF A ROUGHNESS SENSOR, METHOD FOR MEASURING A ROUGHNESS OF A WORKPIECE SURFACE, COMPUTER PROGRAM PRODUCT, AND MEASURING DEVICE DESIGNED TO PERFORM THE METHODS

(71) Applicant: Carl Zeiss Industrielle Messtechnik GmbH, Oberkochen (DE)

(72) Inventor: Philipp Mayinger, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days. days.

(21) Appl. No.: 15/637,860

(22) Filed: Jun. 29, 2017

(65) Prior Publication Data
US 2017/0299368 A1 Oct. 19, 2017

Related U.S. Application Data

(63) Continuation-in-part of application No. PCT/EP2016/051298, filed on Jan. 22, 2016.

(30) Foreign Application Priority Data

Feb. 25, 2015 (DE) .................. 10 2015 203 369

(51) Int. Cl.
*G01B 11/30* (2006.01)
*G01B 5/28* (2006.01)
*G01B 11/00* (2006.01)

(52) U.S. Cl.
CPC .............. *G01B 5/28* (2013.01); *G01B 11/30* (2013.01); *G01B 11/00* (2013.01)

(58) Field of Classification Search
CPC ............ G01B 11/00; G01B 11/30; G01B 5/28
(Continued)

(56) References Cited

U.S. PATENT DOCUMENTS 4,455,755 A 6/1984 Fritsche et al.
4,627,733 A 12/1986 Wada
(Continued)

FOREIGN PATENT DOCUMENTS

DE 2640894 A1 3/1978
DE 2937431 A1 4/1981
(Continued)

OTHER PUBLICATIONS

Written Opinion of the International Searching Authority dated Mar. 31, 2016 of International Application PCT/EP2016/051298 on which this application is based and English language translation thereof.
(Continued)

*Primary Examiner* — Tri T Ton
(74) *Attorney, Agent, or Firm* — Ewers & Hasselmann PLLC

(57) ABSTRACT

A method for determining measurement conditions of a roughness sensor having at least one measuring needle, a computer program product and a measuring device for carrying out the method are provided. The measuring needle is positioned on a surface in a rest state and rests on the surface without being moved. Measurement signals are recorded in the rest state. A signal line of the roughness sensor is electrically grounded and measurement signals are recorded in the grounded rest state. Further, a method for measuring a roughness of a workpiece surface by the roughness sensor is provided in which the measuring needle is guided along a surface section of the workpiece surface to be measured and moved in a measurement direction (x-di-
(Continued)

rection). The movement of the measuring needle in a plane (yz-plane) perpendicular to the measurement direction is recorded during the movement of the measuring needle along the workpiece surface.

7 Claims, 4 Drawing Sheets

(58) Field of Classification Search
USPC .................................................. 356/600–640
See application file for complete search history.

(56) References Cited

U.S. PATENT DOCUMENTS

| | | | |
|---|---|---|---|
| 5,352,038 | A | 10/1994 | Schmidt et al. |
| 5,579,246 | A | 11/1996 | Ebersbach et al. |
| 6,357,286 | B1 | 3/2002 | Kanematsu et al. |
| 6,510,363 | B1 | 1/2003 | Hidaka et al. |
| 7,347,084 | B2 | 3/2008 | Tölzer et al. |
| 7,363,181 | B2 | 4/2008 | Katayama et al. |
| 7,373,807 | B2 | 5/2008 | Hama |
| 7,827,856 | B2 | 11/2010 | Dörrer et al. |
| 8,006,399 | B2 | 8/2011 | Wallace et al. |
| 8,627,576 | B2 | 1/2014 | Engel |
| 2005/0194534 | A1 | 9/2005 | Kneedler et al. |
| 2008/0078229 | A1 | 4/2008 | Mancevski et al. |
| 2012/0266475 | A1 | 10/2012 | Nakayama et al. |

FOREIGN PATENT DOCUMENTS

| | | |
|---|---|---|
| DE | 3247238 A1 | 7/1983 |
| DE | 4342312 A1 | 6/1995 |
| DE | 4437033 A1 | 4/1996 |
| DE | 10020734 A1 | 11/2000 |
| DE | 10020735 A1 | 11/2000 |
| DE | 10230009 A1 | 1/2001 |
| DE | 20120127 U1 | 4/2002 |
| DE | 10334219 B3 | 12/2004 |
| DE | 102004011728 A1 | 9/2005 |
| DE | 102005035786 B3 | 1/2007 |
| DE | 202008011629 U1 | 12/2008 |
| DE | 202013102043 U1 | 7/2013 |
| DE | 202013102045 U1 | 7/2013 |
| EP | 2486369 B1 | 6/2010 |
| EP | 2207006 A2 | 7/2010 |
| JP | S59168304 | 9/1984 |

OTHER PUBLICATIONS

International Search Report dated Mar. 31, 2016 of international application PCT/EP2016/051298 on which this application is based.
Office Action issued in German Patent Application No. DE 10 2015 203 369.4, dated Nov. 2, 2015 and English language translation thereof.
Office Action dated Nov. 28, 2017 issued in Japanese counterpart application No. 2017-530053 and English-language Office Action Summary thereof.

METHOD FOR DETERMINING MEASUREMENT CONDITIONS OF A ROUGHNESS SENSOR, METHOD FOR MEASURING A ROUGHNESS OF A WORKPIECE SURFACE, COMPUTER PROGRAM PRODUCT, AND MEASURING DEVICE DESIGNED TO PERFORM THE METHODS

CROSS REFERENCE TO RELATED APPLICATIONS

This application is a continuation application of international patent application PCT/EP2016/051298, filed Jan. 22, 2016, designating the United States and claiming priority to German application 10 2015 203 369.4, filed Feb. 25, 2015, and the entire content of both applications is incorporated herein by reference.

TECHNICAL FIELD

The present invention relates to a method for determining measurement conditions of a roughness sensor, a method for measuring the roughness of a workpiece surface, a computer program product for controlling the roughness sensor according to the methods, and a measuring device which is configured to carry out the methods.

BACKGROUND

By way of example, roughness sensors and measuring devices for measuring the roughness of a workpiece surface are known from U.S. Pat. No. 6,357,286, document DE 102 30 009 A1, U.S. Pat. No. 7,347,084, U.S. Pat. No. 7,827,856, document DE 201 20 127 U1, document DE 20 2013 102 043 U1, document DE 20 2013 102 045 U1, U.S. Pat. No. 8,006,399, U.S. Pat. No. 7,363,181, U.S. Pat. No. 7,373,807 and U.S. Patent Application Publication No. 2012/0266475.

Document DE 44 37 033 A1 discloses an advancing device for exactly guiding a roughness sensor using the stylus method which, in contrast to a skidded guide (in this respect, see document DE 26 40 894), facilitates ascertaining the waviness or the form of a workpiece in addition to capturing the roughness. However, a disadvantage of a roughness sensor in accordance with document DE 44 37 033 A1 is that the latter is very sensitive, which often also leads to unnoticed measurement inaccuracies or malfunctions, and therefore, this roughness sensor is regularly only suitable for a laboratory setting. Further, the roughness sensor requires much outlay for servicing and calibration, it is expensive, and it is therefore often only used for random checks. Here, as a rule, the sensor is calibrated based on glass or ceramic plates with a known roughness.

Therefore, the document DE 20 2008 011 629 U1 proposes a different roughness sensor for use in production environments. The roughness sensor includes a vibration detector for capturing the vibrations present in the production environments. Further, the roughness sensor includes suitable interfaces for data communication. As a result, the roughness sensor becomes complex and expensive.

SUMMARY

It is therefore an object of the present invention to provide a method, with the aid of which a simple, compact, and cost-effective roughness sensor suitable for production may be realized. Moreover, the invention solves the problem that, in the case of customer problems, a service technician is usually unable to distinguish between a device fault of the roughness measuring device and unsuitable surroundings or an unsuitable installation of the roughness measuring device.

The object is achieved by providing a method for determining the measurement conditions of a roughness sensor with at least one measuring needle, wherein the at least one measuring needle of the roughness sensor is positioned on a surface in a first method step and, in the process, the at least one measuring needle contacts the surface, including a further second method step, in which the at least one measuring needle rests on the surface and the at least one measuring needle is therefore not actively moved along the surface, and in which the roughness sensor registers the measurement signals of the at least one measuring needle in this rest state. Here, a roughness sensor with at least one measuring needle within the meaning of this invention is a stylus instrument pursuant to EN ISO 3274, wherein the stylus tip of the measuring needle has the geometry defined in point 4.1 of the aforementioned standard.

According to an aspect of the invention, it has been identified that the environmental influences or measurement conditions in the form of vibrations and in the form of electromagnetic interferences may be captured by the measurement signals of the at least one measuring needle of the roughness sensor in the rest state when contacting the surface to be measured, and that sensors for capturing the measurement conditions, which are otherwise required, become superfluous as a result thereof.

Based on a measurement in the rest state, the environmental influence on the roughness sensor may be captured by a method according to an aspect of the invention at any time at the start of a measurement or after the completion of a measurement of a surface of a workpiece. It is therefore possible to dispense with possible sensors for capturing the environmental influences, as a result of which the roughness sensor may have a simpler and more compact embodiment.

In an exemplary embodiment, the method for determining the measurement conditions of a roughness sensor with at least one measuring needle includes a further third method step, in which the signal line of the roughness sensor is electrically grounded in addition to the aforementioned further second method step, and measurement signals of the at least one measuring needle of the roughness sensor are likewise recorded in this grounded rest state. As a result, it is possible to separate the environmental influences on the measuring needle or on the roughness sensor in view of the causes thereof. Electromagnetic interferences may be registered both in the rest state and in the grounded rest state of the measuring needle. By contrast, vibrations from the surroundings may only be captured in the rest state and not in the grounded rest state.

In a further exemplary embodiment of the method according to the invention, in a subsequent fourth method step, characteristics based on statistical averaging of the recorded measurement signals of the at least one measuring needle are ascertained for the measurement signals of the at least one measuring needle in the rest state and/or for the measurement signals of the at least one measuring needle in the grounded rest state. Statistical averaging is understood here to mean standard mathematical methods for averaging, e.g., forming the root mean square or the arithmetic mean. Using the ascertained characteristics, it is possible to obtain reliable statements in respect of the environmental influences in the form of vibrations and in the form of electromagnetic interferences, based on which a decision may be made as to whether a meaningful measurement of the roughness of a workpiece surface is possible. These characteristics also facilitate a comparative assessment of installation locations of a roughness measuring device.

In a further exemplary embodiment, in a subsequent fifth step, the ascertained characteristics are compared to predetermined threshold values for the measurement signals of the at least one measuring needle recorded in the rest state and/or for the measurement signals of the at least one measuring needle recorded in the grounded rest state and a fault signal is produced if the threshold values are exceeded. By way of example, this fault signal may be displayed on a monitor or it may also be used to mark roughness values of a workpiece surface, ascertained immediately therebefore or thereafter, as invalid. Here, the roughness values may be marked likewise in a graphical manner, for example by a corresponding color display on a monitor, or purely in the software within the measurement value files.

In a further exemplary embodiment of the method according to an aspect of the invention, the characteristics are stored for a subsequent correction of the measurement values of the roughness sensor. These stored characteristics may subsequently serve as evidence for a valid roughness measurement on a workpiece surface.

Further, the object of the present invention is achieved by providing a method for measuring the roughness of a workpiece surface by a roughness sensor with at least one measuring needle, said method including: a method according to an exemplary embodiment of the invention, already presented above, for determining the measurement conditions of a roughness sensor; and the method step of guiding the at least one measuring needle along the surface section of the workpiece surface to be measured, wherein, as a result, the at least one measuring needle is actively moved in a measurement direction and the movement of the at least one measuring needle in a plane perpendicular to the measurement direction is recorded during the active movement of the at least one measuring needle along the workpiece surface. As a result, according to an aspect of the invention, the method for determining the measurement conditions of a roughness sensor with at least one measuring needle is carried out when measuring the roughness of a workpiece surface for securing the captured roughness measurement values, wherein according to an aspect of the invention, the method for determining the measurement conditions is carried out within the scope of a roughness measurement immediately at the start of a measurement or else immediately after measuring a surface section of a workpiece to be measured.

In an exemplary embodiment of the method according to a further aspect of the invention for measuring the roughness of a workpiece surface, user information about the roughness of the workpiece surface is ascertained and output on the basis of the measurement values for the movement of the at least one measuring needle in a plane perpendicular to the measurement direction and on the basis of the ascertained characteristics for the measurement signals of the at least one measuring needle in the rest state and/or for the measurement signals of the at least one measuring needle in the grounded rest state. Here, the user information may be referred directly to the user or the operator of the roughness sensor by an output on a monitor, or it may be forwarded to the control software or the user of the roughness sensor. The user information contains measurement value information about the ascertained roughness values of the measured surface, in which the characteristics for documenting the measurement conditions and/or even for correcting the ascertained roughness values have been included.

Moreover, the object of the present invention is achieved by providing a computer program product for controlling a roughness sensor with at least one measuring needle according to one of the methods already presented above.

The object of the present invention is likewise achieved by providing a measuring device including a roughness sensor with at least one measuring needle, a control unit and an evaluation unit configured to carry out one of the methods according to the aspects of the invention already presented above.

In an exemplary embodiment, the measuring device according to an aspect of the invention includes control electronics for the roughness sensor, which facilitate grounding of the signal line of the roughness sensor.

In a further exemplary embodiment, the measuring device includes an additional switching element for the control electronics for selective grounding of the signal line. Switching between the measurement in the rest state and the measurement in the grounded rest state is facilitated by selective grounding of the signal line of the roughness sensor.

Further features and advantages of the invention emerge from the following description of exemplary embodiments of the invention based on the figures, which show details essential to the invention, and from the claims. The individual features may be realized in each case individually by themselves or as a plurality in any desired combination in a variant of the invention.

BRIEF DESCRIPTION OF THE DRAWINGS

The invention will now be described with reference to the drawings wherein.

DESCRIPTION OF EXEMPLARY EMBODIMENTS

Figure 1:
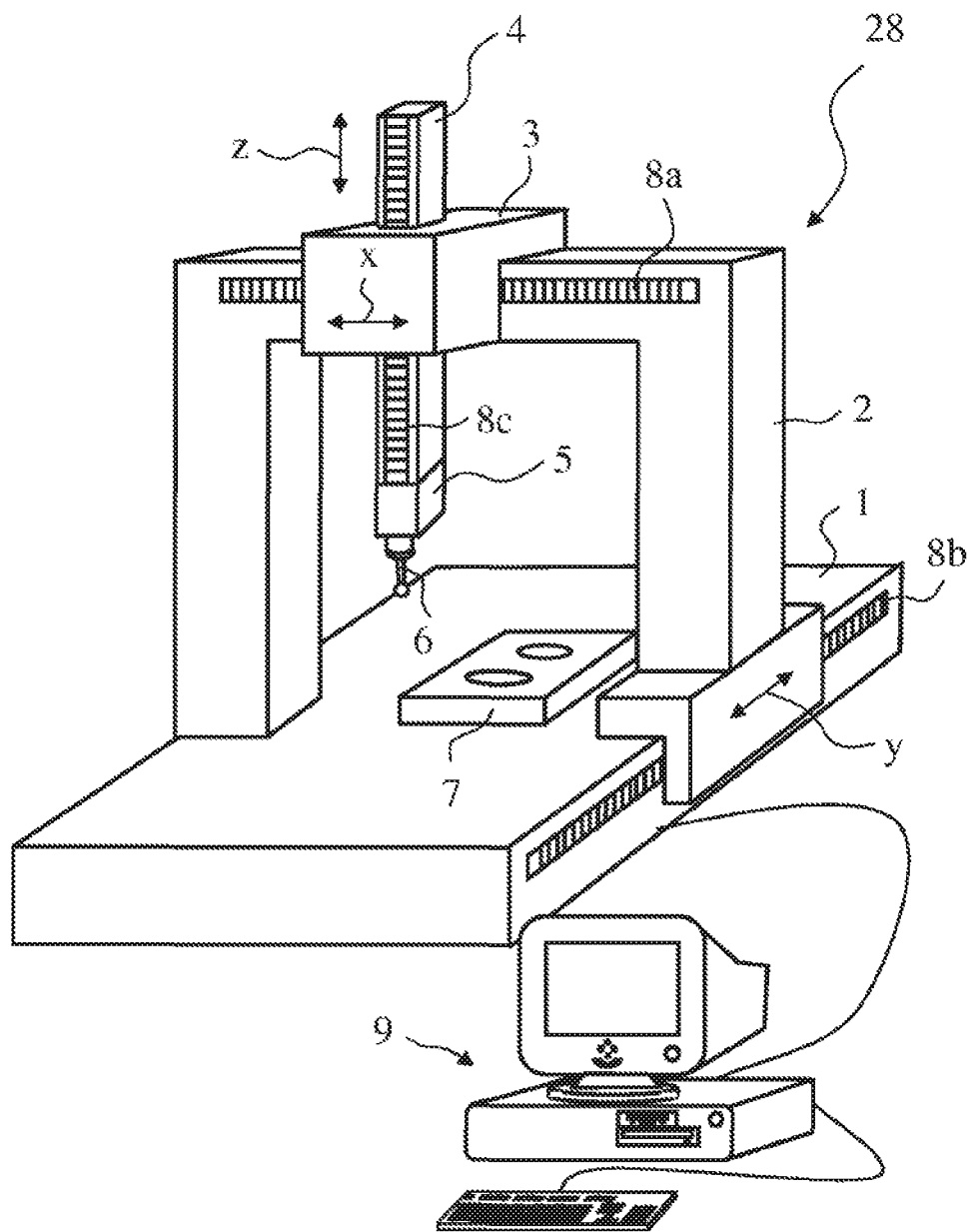
FIG. 1 shows a schematic illustration of a coordinate measuring machine with a portal design.

FIG. 1 shows a coordinate measuring device 28 with a quill 4 with a so-called portal design in a purely exemplary manner. However, it is understood that the present invention may be used in all coordinate measuring devices, in particular, in coordinate measuring devices with a bridge or stand design, and in arm or robot coordinate measuring devices. Hence, the expression coordinate measuring device within the scope of the present application extends to all of the aforementioned coordinate measuring devices and variations thereof.

The coordinate measuring device 28 shown in FIG. 1 has a stylus 6, which is fastened in a replaceable manner to a measuring head or probe head 5, and which may be deflected in relation to the probe head 5 in three coordinate directions x, y and z. The deflection of the stylus 6 in the three coordinate directions x, y and z is detected by way of three transducers located in the probe head 5. The probe head 5 in turn may be moved in the three coordinate directions x, y and z. The portal mechanism has a measuring portal 2, which may be displaced in relation to the measurement table 1 in the coordinate direction denoted by the arrow y. A measuring slider 3 is movably guided in the direction denoted by the arrow x along the crossbeam of the measuring portal 2 spanning the measurement table 1. The quill 4 is movably guided on the measuring slider 3 in the vertical direction denoted by the arrow z such that the probe head 5 may be displaced in the three coordinate directions x, y and z by way of the portal mechanism. In the case of a coordinate measuring device with a bridge design, a measuring bridge adopts the task of the measuring portal 2 of displacing the measuring slider 3 with the quill 4 in the coordinate direction y. A workpiece is measured in such a way that the stylus 6 probes the workpiece 7 to be measured at predetermined measurement points, wherein the deflection in terms of the three coordinate directions x, y and z of the stylus 6 in relation to the probe head 5 is measured in the probe head 5. Additionally, the current position of the probe head 5 is measured in the three coordinate directions x, y and z at the three incremental scales 8a-8c, which are scanned by optical reader heads. In order to ascertain a measurement point, the scale measured values 8a-8c are combined by calculation in terms of the correct components with the stylus deflections ascertained by the transducers in the probe head 5 and a measurement point is generated therefrom.

Different styluses are usually required in order to be able to measure complex workpieces with a complex geometry and the styluses are stored in a cartridge (not depicted) and may be inserted in an automated manner by way of a changer apparatus at the probe head 5. The different styluses usually have one or more probe shafts, at the ends of which it is possible to fasten a probe body, e.g., a probe sphere or a cylinder. By way of example, a horizontal bore is measured using a horizontally aligned probe shaft, i.e. by using a so-called laterally arranged stylus 6, while a vertical bore is measured by using a vertically aligned probe shaft.

The measurement process and the drive of the coordinate measuring machine are controlled and the measured values ascertained in the process are recorded and evaluated by a control and evaluation unit 9, which, in an exemplary manner, is realized by a single computer in this exemplary embodiment. The control and evaluation unit 9 may additionally be connected to an operating console (not depicted) by which the coordinate measuring machine may also be displaced manually in the coordinate directions x, y and z by way of operating lever and by which it is also possible to undertake other functions, e.g., a change of stylus or an operation of the measuring program.

Figure 2:
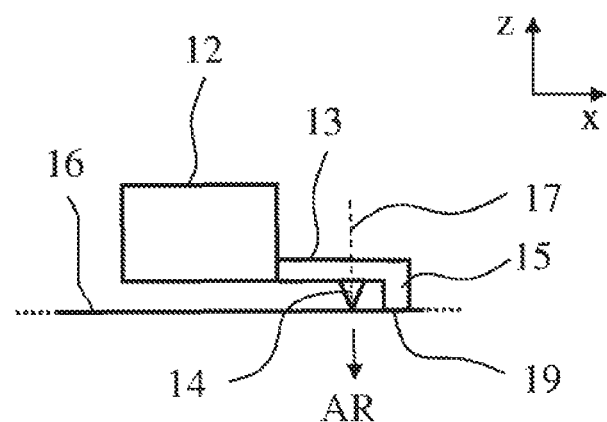
FIG. 2 shows a schematic illustration of a roughness sensor.

As an alternative to the probe head 5 shown in FIG. 1, the coordinate measuring device 28 in FIG. 1 may also be equipped with an optical measuring system or with a roughness sensor 12 in accordance with FIG. 2 as measuring head 5. Here, the roughness sensor 12 may also be fastened to the quill of the coordinate measuring device 28 by way of a so-called rotary swivel joint. An arbitrary orientation of the roughness sensor 12 in space in relation to the surface of the workpiece to be measured is facilitated by such a rotary swivel joint.

FIG. 2 shows a schematic illustration of a roughness sensor 12. The roughness sensor 12 includes a probing arm 13 and a measuring needle 14, which is arranged at one end of the probing arm 13. The measuring needle 14 has a conical embodiment. The roughness sensor 12 includes a support element 15 immediately opposite the measuring needle 14 and the roughness sensor is placed on a surface 16 of a workpiece to be measured (not depicted in any more detail). The measuring needle 14 rests on the surface 16 in this case. However, the exemplary embodiment of the present invention is not restricted to the roughness sensor 12 depicted in FIG. 2, but may instead be used in all roughness sensors based on measuring needles, e.g., stylus-and-arm systems or skidded gages.

The measuring needle 14 of the roughness sensor 12 in FIG. 2 may be moved along a longitudinal axis x and along a preferably linear measurement path for the purposes of measuring the roughness of the surface 16 of the workpiece to be measured. In the process, the measuring needle 14, and hence the probing arm 13 as well, may be deflected. Here, the deflection occurs in a yz-plane lying perpendicular to the x-direction with, at least proportionally, the greatest value in a vertical direction, which is indicated by a vertical axis z. Depicted further is a center line 17 of the measuring needle 14, with a probing direction AR of the roughness sensor 12, in a non-deflected state of the roughness sensor 12, being oriented along the center line 17 and counter to the vertical direction z explained above.

The probing direction AR in this case corresponds to a placement direction of the roughness sensor 12, with the placement direction being oriented perpendicular to a contact area 19 of the roughness sensor 12. The contact area 19 denotes an area which is in contact with the surface 16 of the workpiece when the roughness sensor 12 is placed.

Figure 3:
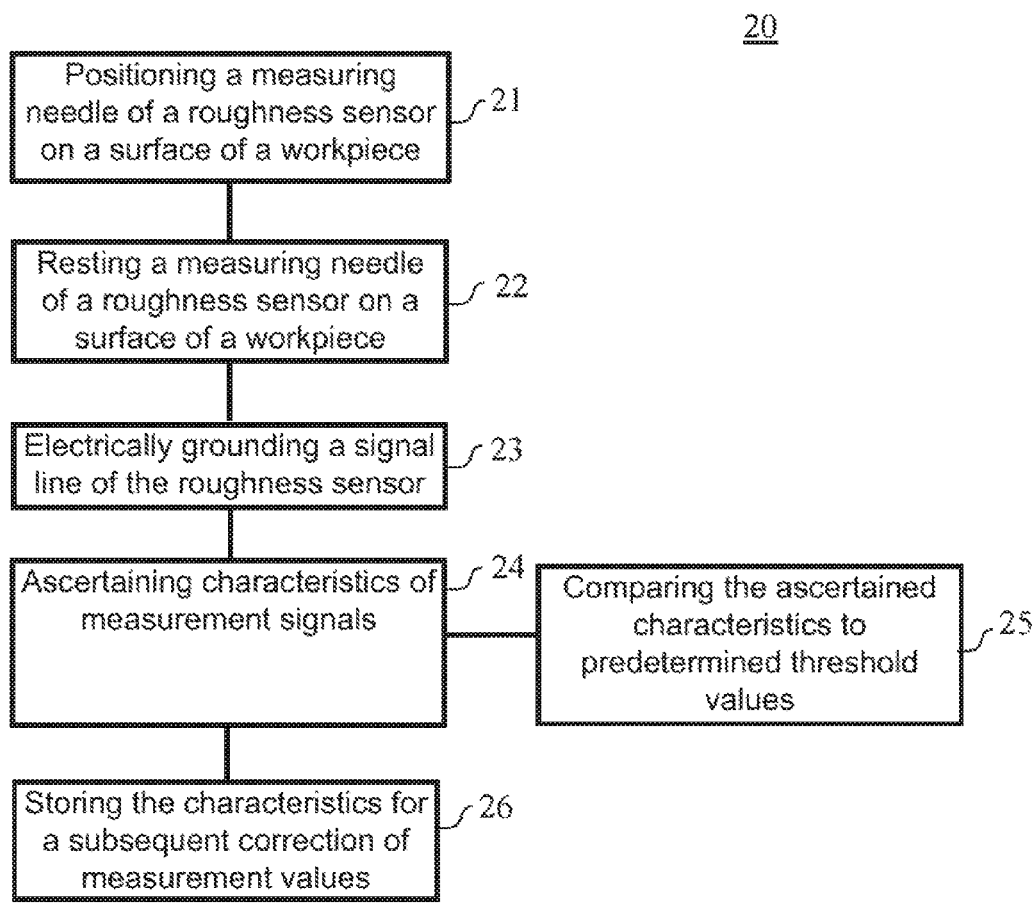
FIG. 3 shows a flowchart of the method for determining the measurement conditions of a roughness sensor according to an exemplary embodiment of the invention.

FIG. 3 schematically shows a flowchart of method 20 according to an exemplary embodiment of the invention for determining measurement conditions of a roughness sensor 12 with at least one measuring needle 14, wherein the at least one measuring needle 14 of the roughness sensor 12 is positioned or placed on a surface 16 in a first method step 21 and, in the process, said at least one measuring needle contacts this surface 16. The method includes a further second method step 22, in which the at least one measuring needle 14 rests on the surface 16 and the at least one measuring needle is therefore not actively moved along the surface 16, and in which the roughness sensor 12 registers the measurement signals of the at least one measuring needle 14 in this rest state. As a result, it is possible to capture the environmental influences in the form of vibrations and in the form of electromagnetic interferences on the roughness sensor 12. In addition to the aforementioned second method step 22, the signal line of the roughness sensor 12 is electrically grounded in a depicted third method step 23 and the signal curve is likewise recorded. Only the electromagnetic interferences of the roughness sensor are detected during the capture in the grounded rest state. Therefore, the electromagnetic interferences may be captured, isolated from the environmental influences, on account of vibrations in the grounded rest state.

As an alternative to the illustration in FIG. 3, method step 23 may also be carried out before method step 22.

In a subsequent fourth method step 24, characteristics based on statistical averaging of the determined measurement signals of the at least one measuring needle 14 are ascertained for the measurement signals of the at least one measuring needle 14 recorded in the rest state and/or for the measurement signals of the at least one measuring needle 14 recorded in the grounded rest state. Then, an evaluation of the order of magnitude of the environmental influences is possible based on these characteristics.

Further, in a subsequent fifth step 25, the ascertained characteristics are compared to predetermined threshold values for the measurement signals of the at least one measuring needle 14 recorded in the rest state and/or for the measurement signals of the at least one measuring needle 14 recorded in the grounded rest state. Here, a fault signal is produced if the thresholds are exceeded. These threshold values therefore represent limits for the characteristics. A reliable roughness measurement of a workpiece surface is possible below the threshold values or limits; the interferences by environmental influences on a roughness measurement of a workpiece surface are significant above the threshold values or limits.

In a further step 26, the characteristics may be stored for a subsequent labeling and/or even correction of the measurement values of the roughness sensor 12. Alternatively, these characteristics may also be stored together with the instances of exceeding or staying below the threshold values determined in step 25.

Figure 4:
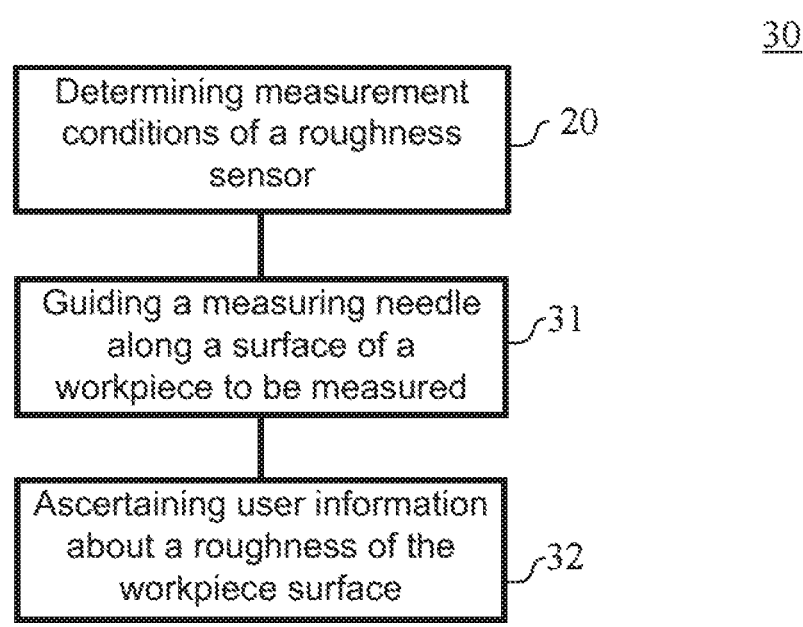
FIG. 4 shows a flowchart of a roughness measurement method according to an exemplary embodiment of the invention.

FIG. 4 shows a flowchart of a method 30 for measuring the roughness of a workpiece surface 16 by a roughness sensor 12 with at least one measuring needle 14 according to an exemplary embodiment of the invention, said method including the method 20 for determining the measurement conditions of a roughness sensor 12 as shown in FIG. 3, and the method step 31 of guiding the at least one measuring needle 14 along the surface section of the workpiece surface 16 to be measured, wherein, as a result, the at least one measuring needle 14 is actively moved in a measurement direction (x-direction in FIG. 2) and wherein the movement of the at least one measuring needle 14 in a plane (yz-plane in FIG. 2) perpendicular to the measurement direction is registered or recorded during the active movement of the at least one measuring needle 14 along the workpiece surface 16.

As a result of the conducting of the method 20 for determining the measurement conditions of a roughness sensor 12 being carried out immediately before or immediately after a measurement of the roughness of a surface section of a workpiece surface 16 within the scope of the roughness measuring method 30 according to an exemplary embodiment of the invention, current characteristics for the environmental influences for evaluating the roughness measurement are always available.

In a further method step 32, user information about the roughness of the workpiece surface 16 is ascertained and outputted on the basis of the measurement values for the movement of the at least one measuring needle 14 in a plane (yz-plane in FIG. 2) perpendicular to the measurement direction (x-direction in FIG. 2) and on the basis of ascertained characteristics for the measurement signals of the at least one measuring needle 14 in the rest state and/or for the measurement signals of the at least one measuring needle 14 in the grounded rest state. Now, this user information takes account of, firstly, the captured roughness measurement values of the workpiece surface 16 and, secondly, the ascertained characteristics for the environmental influences.

In the simplest case, the user information merely consists of the captured roughness measurement values and the ascertained characteristics or predetermined threshold values. However, it is also possible to form mathematical relationships between the roughness measurement values and the characteristics for generating user information in order to output a surface roughness, which is falsified as little as possible, in the form of measurement values. Therefore, the user information may be resultant roughness values which, taking into account the characteristics, are output to the operator of the roughness sensor 12 on a monitor or which are provided to the user in the form of evaluation software by a file or measurement value format.

The methods 20 and 30 depicted in FIGS. 3 and 4 according to the exemplary embodiments of the invention, may be carried out by appropriate software with the aid of, e.g., the control and evaluation unit 9 (processor) of the coordinate measuring device 28 shown in FIG. 1 or with the aid of, e.g., a separate control and evaluation unit of the roughness sensor 12 shown in FIG. 2 or with the aid of a separate control and evaluation unit of a separate measuring device for handling a roughness sensor 12. A corresponding computer program product for controlling a roughness sensor 12 with at least one measuring needle 14 may be provided by any type of computer readable non-transitory storage medium for the aforementioned control and evaluation units.

Therefore, the present invention also includes measuring devices which are configured to carry out the methods 20 and 30 according to an exemplary embodiment of the invention and which include a roughness sensor 12 with at least one measuring needle 14, and a control and evaluation unit or processor. By way of example, such a measuring device may be a coordinate measuring device 28 as shown in FIG. 1 or a separate measuring device, not depicted in any more detail, for handling roughness sensors. The control electronics of these measuring devices facilitate grounding of the signal line of the roughness sensor. The control electronics may include an additional switching element for selective grounding of the signal line of the roughness sensor.

It is understood that the foregoing description is that of the exemplary embodiments of the invention and that various changes and modifications may be made thereto without departing from the spirit and scope of the invention as defined in the appended claims.

What is claimed is:

1. A method for determining measurement conditions of a roughness sensor having at least one measuring needle, the method comprising the steps of:
   (a) positioning the at least one measuring needle of the roughness sensor on a surface, the at least one measuring needle thereby contacting the surface;
   (b) resting the at least one measuring needle in a rest state on the surface without moving the at least one measuring needle along the surface and concurrently recording measurement signals of the at least one measuring needle by the roughness sensor; and
   (c) electrically grounding a signal line of the roughness sensor in a grounded rest state and concurrently recording the measurement signals of the measuring needle in the grounded rest state.

2. The method of claim 1, further comprising the step of:
   (d) ascertaining characteristics based on statistical averaging of at least one of the measurement signals of the at least one measuring needle recorded in the rest state and the measurement signals of the at least one measuring needle recorded in the grounded rest state.

3. The method of claim 2, further comprising the step of:
   (e) comparing the ascertained characteristics to predetermined threshold values for the at least one of the measurement signals of the at least one measuring needle recorded in the rest state and the measurement signals of the at least one measuring needle recorded in the grounded rest state, and generating a fault signal if the predetermined threshold values are exceeded.

4. The method of claim 2, further comprising the step of:
   (f) storing the characteristics for a subsequent correction of measurement values of the roughness sensor.

5. A method for measuring a roughness of a workpiece surface by a roughness sensor having at least one measuring needle, the method comprising the steps of:

(a) positioning the at least one measuring needle of the roughness sensor on a surface, the at least one measuring needle thereby contacting the surface;
(b) resting the at least one measuring needle in a rest state on the surface without moving the at least one measuring needle along the surface and concurrently recording measurement signals of the at least one measuring needle by the roughness sensor;
(c) guiding the at least one measuring needle along a surface section of the workpiece surface to be measured thereby moving the at least one measuring needle in a measurement direction;
(d) recording a movement of the at least one measuring needle in a plane perpendicular to the measurement direction when moving the at least one measuring needle along the workpiece surface;
(e) ascertaining user information about the roughness of the workpiece surface based on:
measurement values for the movement of the at least one measuring needle recorded in the plane perpendicular to the measurement direction; and
characteristics ascertained based on statistical averaging of at least one of the measurement signals of the at least one measuring needle recorded in the rest state and the measurement signals of the at least one measuring needle recorded in the grounded rest state; and
(f) outputting the user information.

6. A non-transitory computer readable storage medium encoded with program code comprising computer executable instructions for controlling a roughness sensor having at least one measuring needle and when the program code is executed operable to:
(a) position the at least one measuring needle of the roughness sensor on a surface, the at least one measuring needle thereby contacting the surface;
(b) rest the at least one measuring needle in a rest state on the surface without moving the at least one measuring needle along the surface and concurrently record measurement signals of the at least one measuring needle by the roughness sensor; and
(c) electrically grounding a signal line of the roughness sensor in a grounded rest state and concurrently recording the measurement signals of the measuring needle in the grounded rest state.

7. A measuring device comprising:
a roughness sensor having at least one measuring needle;
control electronics for the roughness sensor configured to ground a signal line of the roughness sensor;
an additional switching element for the control electronics configured to selectively ground the signal line; and
a processor coupled to the roughness sensor and being configured to:
(a) position the at least one measuring needle of the roughness sensor on a surface, the at least one measuring needle thereby contacting the surface; and
(b) rest the at least one measuring needle in a rest state on the surface without moving the at least one measuring needle along the surface and concurrently record measurement signals of the at least one measuring needle by the roughness sensor.

* * * * *